United States Patent
Flurschütz et al.

(10) Patent No.: US 6,428,600 B1
(45) Date of Patent: Aug. 6, 2002

(54) PROCESS FOR PRODUCING SPHEROIDIZED HARD MATERIAL POWDER

(76) Inventors: Walter Flurschütz, Rathausstrasse 35, D-98597 Breitungen (DE); Alexander Klein, Heinrich-Heine-Str. 29, D-36448 Schweina (DE); Rudi Horn, Werrastrasse 29, D-98597 Breitungen (DE); Simon Zakharian, Obere Bismarckstrasse 91/1, D-70197 Stuttgart (DE)

( * ) Notice: Subject to any disclaimer, the term of this patent is extended or adjusted under 35 U.S.C. 154(b) by 0 days.

(21) Appl. No.: 09/668,621

(22) Filed: Sep. 22, 2000

(30) Foreign Application Priority Data

Sep. 22, 1999 (DE) .......................................... 199 45 318

(51) Int. Cl.⁷ .................................................. B22F 9/22
(52) U.S. Cl. ............................ 75/336; 75/346; 75/10.19
(58) Field of Search ....................... 75/336, 346, 10.19; 148/222

(56) References Cited

U.S. PATENT DOCUMENTS

| | | | | |
|---|---|---|---|---|
| 3,783,167 A | * | 1/1974 | Tylko | 75/10.19 |
| 3,848,068 A | * | 11/1974 | Rice | 423/592 |
| 4,701,301 A | * | 10/1987 | Kuwahara et al. | 75/10.19 |
| 5,221,322 A | * | 6/1993 | Tokuoka et al. | 75/346 |
| 5,935,461 A | * | 8/1999 | Witherspoon et al. | 75/346 |

FOREIGN PATENT DOCUMENTS

| | | |
|---|---|---|
| DE | 43 39 345 A1 | 5/1995 |
| EP | 0 687 650 A1 | 12/1995 |
| EP | 0 887 432 A2 | 12/1998 |
| EP | 0 777 759 B1 | 3/1999 |
| JP | 3-131583 | * 6/1991 |

* cited by examiner

*Primary Examiner*—George Wyszomierski
(74) *Attorney, Agent, or Firm*—Husch & Eppenberger, LLC; Robert E. Muir; Richard J. Musgrave

(57) ABSTRACT

The spheroidized hard material powders are produced by introducing a finely ground basic mixture of hard material into a thermal, inductively coupled high-frequency plasma so that at the same time a chemical conversion reaction to form an alloy and/or chemical reaction and spheroidization of the particles in the plasma take place. The hard material mixture may be powder, granules, or a suspension or any combination thereof. Hence, a mixture consisting of $Me_xM_y$, wherein Me is a metal and M is a metalloid so that different metals and metalloids may be combined in the required metal-metalloid ratio is injected axially into an inductively coupled, high-frequency plasma with the aid of a carrier gas stream. The spheroidized hard material powder has excellent suitability for protection against wear.

26 Claims, No Drawings

PROCESS FOR PRODUCING SPHEROIDIZED HARD MATERIAL POWDER

BACKGROUND OF THE INVENTION

The invention relates to the field of hard material powder and hard metal granules for producing hard metal coatings. These are dense materials that are also very hard. These materials are preferably applied in spherical form to tools, for example, boring tools and bore rods or others. This is to impart a high resistance to wear and a toughness to these tools and parts that diminishes the effects of abrasion and impact.

The invention relates in particular to spheroidized hard metal powders, which are also generally represented as $Me_xM_y$ powders or corresponding granules, which are applied for coating expendable parts, inter alia, by means of flame spraying, plasma spraying and related technologies. Me is defined as a metal and M is defined as a metalloid. The preformed powder is thus sprayed onto the surface to be coated, for example, in direct-current plasma.

According to a classic production process for a coating powder in the afore-mentioned sense, for example, the following process steps are executed: A basic mixture of hard metal powder (for example based on $WC/W_2C$) is initially produced by mixing and grinding the components. This mixture is then converted to a largely homogeneous melt at about 3,000° C. After cooling this melt, the fused-together hard metal is comminuted and screened. A fraction having a preset fine grain size is then rounded off by repeated heating (this may take place in a plasma) and used for coating the expendable parts after final cooling.

As can be seen easily, the known process is already very expensive due to the number of working steps. In addition, this process is intensive in terms of energy and cost, which is the result, inter alia, of the production of the high-temperature melt and the subsequent comminution of the hard material.

A method, which should simplify and shorten the above-mentioned process, is also already known from European Application 0 687 650. The hard material, for example, tungsten carbide, is thus melted in a crucible by means of a plasma flame. The use of a plasma flame provides a significant shortening of the melting time. After producing the hard material melt, the latter is passed in a defined melt stream to a rapidly rotating cooling disc. The cooling disc is rotated at very high speed and thus cooled, resulting in very fine hard material spheres. As a result of this process, hard material granules of a certain quality and having a certain structure are produced, on which influence may be effected only to a very limited extent. The need for novel hard metal coating powders that can be produced cost-effectively is significant.

The present invention is directed to overcoming one or more of the problems set forth above.

SUMMARY OF THE INVENTION

An aspect of the invention is to provide a good-flowing, thus separation-free powder or granules for hard material coating, in particular of expendable parts, by plasma spraying, and to develop a process for its production, which may be carried out in as few working steps as possible and is efficient in terms of cost and energy.

Another aspect of the invention is a process for producing spheroidized hard material powder is disclosed. This process includes the following process steps of producing a finely ground mixture of hard material, wherein the mixture of the hard material is selected so that under conditions of a high-frequency plasma, a reaction starts between constituents of the mixture of the hard material, and introducing the mixture of the hard material with a carrier gas stream into a working gas stream of a thermal, inductively coupled, high-frequency plasma and as a result of which the reaction occurs in one step with a formation of spheroidized hard metal particles.

DETAILED DESCRIPTION

The first step is the production of a mixture of hard material. The constituents of the hard material required for later coating or starting materials for this hard material, which are later reacted in the process with a reactive gas within the plasma, are thus mixed and finely ground, for example in an attrition mill.

The mixture may be used either directly in a suspension or additionally may be finely granulated, for example in spray drying with optional subsequent degassing. A suspension may also be produced from the hard material powder, for example, may be produced using a hydrocarbon which reacts with the powder components in the plasma.

The mixture thus produced in powder, granules or suspension form is then introduced into the working gas of a thermally, inductively coupled high-frequency plasma, hereinafter also referred to as "ICP", within a carrier gas stream. The above-given hard material mixture with the carrier gas stream is thus blown through the plasma arc of the high frequency plasma.

There are a number of ICP plasma systems known or available so that a description of a suitable apparatus is completely unnecessary.

The particles are spheroidized after passage through the plasma arc are then cooled in an additional quench gas stream at high speed below a recrystallization temperature and are collected behind the plasma. The quench gas stream is an additional cooling gas stream that is generally inert and supplied separately to the system.

The extremely compact process design is particularly advantageous in the invention. This is due to the fact that both the reaction of the components with one another, alloy formation as well as the spheroidization take place in one unitary step within the plasma. The separate step of melting the starting materials, and hence optionally, also the subsequent steps of comminution, screening, rounding-off of the melt product, are omitted. The course of the process is very much simplified and shortened. The process therefore operates in very efficient manner in terms of energy and cost.

A spherical hard material powder, which is homogeneous in its composition and shows good flow behavior when processing in coating application, is obtained. A "spheroidized hard material powder" is thus understood to mean a powder made from a hard material alloy having completely rounded-off particle edges.

The spheroidal granules obtained according to this Invention have the advantage of a structure which is more uniform compared to granules produced by other processes including the quality of the spherical shape for the individual particles. By using the process of this Invention, it is possible to produce the particle size distribution in relatively narrow and adjustably different size classes.

A hard material or a hard material alloy within the scope of the invention is understood to mean in the narrower sense a compound of the form $Me_xM_y$, wherein Me is a metal and M is a metalloid (the formula should be understood so that different metals and metalloids may be combined). Specifically, "metallic hard materials" are therefore understood to mean chemical compounds of Transition Metals of the Subgroup $IV_a$ to $VI_a$ of the Periodic Table with the small atomic elements carbon, nitrogen, boron and silicon, that is the carbides, nitrides, carbonitrides, borides and silicides of the metals: titanium, zirconium, hafnium, vanadium, niobium, tantalum, chromium, molybdenum, tungsten and mixtures thereof.

The alloy system $(W_2C)_{0.5+z}(WC)_{0.5-z}$ where $(z<0.5)$ with high toughness and a high Vickers hardness of greater than 2,000 is preferred within the scope of this Invention.

The starting constituents for the basic mixture of hard metal powder may thus include, but is not limited to, one of the following groups:

a) $W_2C+WC$;
b) $WC+W$;
c) $W+C$;
d) $W+C_nH_{2n+2}$; and
e) $W+$others.

In this case, W is tungsten, C is carbon and H is hydrogen. The starting materials may be present as metals or metal oxides or as preformed alloys between certain individual constituents.

To maintain the ICP plasma, working and enveloping gas stream is also required. A carrier gas stream is required in this gas stream for blowing in the basic mixture in powder, granule or suspension form, and for rapid cooling of the particles after the plasma, a so-called quenching gas stream is required.

In addition to a reaction between hard material starting materials, a reaction with the working and/or carrier gas may therefore also take place, provided it is not a gas which is inert with respect to the constituents of the basic mixture, for example a noble gas, preferably argon.

If a reactive gas is used, it may be selected, for example so that under the conditions of the plasma, it forms carbides with metals or metal oxides of the basic mixture constituents. Methane is preferred in this case. Also, if nitrides are formed, then nitrogen would be the preferred gas in this situation.

The reactions between the basic mixture constituents and the reactive gas may be shown, inter alia, by the following basic formulas:

$$aW+bCH_4 @ c(W_2C)_{0.5+z}(WC)_{0.5-z}+dH_2;$$

$$aTi+bN_2 @ cTiN;$$

and $$aTa_2O_5+bCH_4 @ c(TaC)_x(Ta_2C)_y+dH_2O.$$

In this case, W is tungsten, C is carbon, H is hydrogen, Ti is titanium, Ta is tantalum, O is oxygen, and N is nitrogen.

The thermal, inductively coupled high-frequency plasma is preferably operated at a temperature above 3,000° C., also preferably above 4,000° C. The high inductive field has a generally accelerating effect on the reaction rate and a positive effect on the reaction equilibrium during the formation of $W_2C/WC$.

The basic mixture reacted and blown through the HF plasma is preferably quenched at cooling rates greater than $10^4$ K/s.

The invention is illustrated in more detail below using the following Examples:

EXAMPLE 1

Production of a starting mixture by grinding a mixture of 70% WC+30 W for about 3 hours in an attrition mill with alcohol and the addition of about 1% organic binder. Spray drying is utilized to form preformed granules having correspondingly required grain size. There is an optionally degassing and presintering of the granules to provide a screening-out of required fractions. The granules are passed by means of carrier gas stream into the interior of a gas not participating in the reaction. This gas is preferably Ar (Argon) for Ar-operated plasma (ICP). Quenching using a gas stream supplied after the plasma, preferably $N_2$ (Nitrogen). The final step is Collection of the final powder in a protective gas atmosphere.

EXAMPLE 2

Processing takes place as described above in Example 1; 96% W+4.5% carbon black are used.

EXAMPLE 3

Production of tungsten granules as described in Example 2 and the passing through of the granules into the interior of a gas participating in the reaction, which is a thermal plasma (ICP) preferably operated using $CH_4$. Collection and cooling is as described in Example 1.

EXAMPLE 4

Processing takes place as described in Example 1. 82% $WO_3$ and 18% C carbon black are used.

What is claimed is:

1. A process for producing spheroidized hard material powder comprising the following process steps:
   producing a finely ground mixture of hard material, wherein said mixture of said hard material is selected so that under conditions of a high-frequency plasma, a reaction starts between constituents of said mixture of said hard material;
   introducing said mixture of said hard material with a carrier gas stream into a working gas stream of a thermal, inductively coupled, high-frequency plasma and as a result of which said reaction occurs in one step with a formation of spheroidized hard metal particles; and
   wherein at least one of said starting constituents includes tungsten.

2. The process according to claim 1, wherein said hard material is in the form of powder.

3. The process according to claim 1, wherein said hard material is in the form of granules.

4. The process according to claim 1, wherein said hard material is in the form of a suspension.

5. The process according to claim 1, wherein said hard material is selected from the group consisting of powder, granules and a form of suspension.

6. The process according to claim 1, wherein said reaction is a chemical reaction.

7. The process according to claim 1, wherein said reaction is a formation of an alloy.

8. The process according to claim 1, wherein said reaction between said constituents of said mixture of said hard material includes metal oxides as a starting constituent.

9. The process according to claim 1, wherein said reaction between said constituents of said mixture of said hard material includes carbon as a starting constituent.

10. The process according to claim 1, wherein said gas is an inert gas.

11. The process according to claim 10, wherein said inert gas is argon.

12. The process according to claim 1, wherein said gas is a reactive gas with regard to said mixture of said hard material.

13. The process according to claim 1, wherein said reactive gas forms carbides with said mixture of said hard material that includes metals.

14. The process according to claim 18, wherein said reactive gas is methane.

15. The process according to claim 1, wherein said reactive gas forms carbides with said mixture of said hard material that includes metal oxides.

16. The process according to claim 15, wherein said reactive gas is methane.

17. The process according to claim 1, wherein said reactive gas forms nitrides with said mixture of said hard material that includes metals.

18. The process according to claim 17, wherein said reactive gas is nitrogen.

19. The process according to claim 1, wherein said reactive gas forms nitrides with said mixture of said hard material that includes metal oxides.

20. The process according to claim 19, wherein said reactive gas is nitrogen.

21. The process according to claim 1, wherein said high-frequency plasma has a temperature of over 3,000° C.

22. The process according to claim 1, wherein said high-frequency plasma has a temperature of over 4,000° C.

23. The process according to claim 1, wherein said mixture of said hard material that flows in said working gas stream past said thermal, inductively coupled, high-frequency plasma is then quenched after passage through said thermal, inductively coupled high-frequency plasma arc at cooling rates greater than $10^4$ K/s.

24. The process according to claim 1, wherein the starting constituents are selected from the group consisting of metals, metal oxides, or preformed alloys.

25. A process for producing spheroidized hard material powder comprising the following process steps:

producing a finely ground mixture of hard material, wherein said mixture of said hard material is selected so that under conditions of a high-frequency plasma, a reaction starts between constituents of said mixture of said hard material;

introducing said mixture of said hard material with a carrier gas stream into a working gas stream of a thermal, inductively coupled, high-frequency plasma and as a result of which said reaction occurs in one step with a formation of spheroidized hard metal particles; and wherein at least one of said starting constituents is selected from the group consisting of $W_2C+W$, $WC+W$, $W+C$, and $W+C_nH_{2n+2}$.

26. A process for producing spheroidized hard material powder comprising the following process steps:

producing a finely ground mixture of hard material, wherein said mixture of said hard material is selected so that under conditions of a high-frequency plasma, a reaction starts between constituents of said mixture of said hard material;

introducing said mixture of said hard material with a carrier gas stream into a working gas stream of a thermal, inductively coupled, high-frequency plasma and as a result of which said reaction occurs in one step with a formation of spheroidized hard metal particles; and wherein said reaction is a formation of an alloy produced by said process and said alloy is a two-phase, heterogeneous $W_2C/WC$ alloy of the general composition $(W_2C)_{0.5+z}(WC)_{0.5-z}$ where $z<0.5$.

* * * * *